United States Patent
Bhudavaram et al.

(10) Patent No.: US 12,222,837 B2
(45) Date of Patent: Feb. 11, 2025

(54) MAINTENANCE OF FOCUS ON AN ORIGINAL TASK WHILE SWITCHING AMONG APPLICATIONS

(71) Applicant: INTERNATIONAL BUSINESS MACHINES CORPORATION, Armonk, NY (US)

(72) Inventors: Dinesh Kumar Bhudavaram, Bangalore (IN); Raghuveer Prasad Nagar, Kota (IN); Sarbajit K. Rakshit, Kolkata (IN); Jagadesh Ramaswamy Hulugundi, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/066,976

(22) Filed: Dec. 15, 2022

(65) Prior Publication Data

US 2024/0202094 A1 Jun. 20, 2024

(51) Int. Cl.
G06F 11/34 (2006.01)
G06F 9/451 (2018.01)

(52) U.S. Cl.
CPC .......... G06F 11/3438 (2013.01); G06F 9/453 (2018.02)

(58) Field of Classification Search
CPC ................ G06F 11/3438; G06F 9/453
See application file for complete search history.

(56) References Cited

U.S. PATENT DOCUMENTS

| 8,296,684 B2 | 10/2012 | Duarte et al. |
| 10,203,866 B2 | 2/2019 | Karunamuni et al. |
| 10,901,601 B2 | 1/2021 | Chaudhri |
| 10,996,766 B2 | 5/2021 | Missig et al. |
| 11,221,729 B1 | 1/2022 | Bauchot et al. |
| 11,550,690 B1* | 1/2023 | Basu ...................... G06F 3/0484 |
| 2017/0090690 A1* | 3/2017 | Chor ....................... G06F 9/451 |
| 2019/0050440 A1* | 2/2019 | Novak .................. G06F 3/0482 |
| 2019/0089667 A1 | 3/2019 | Nesbitt |
| 2019/0187862 A1* | 6/2019 | Forster ................. G06F 3/0481 |
| 2019/0213519 A1* | 7/2019 | Metz ...................... G06F 1/1684 |
| 2019/0354256 A1 | 11/2019 | Karunamuni et al. |
| 2020/0258022 A1* | 8/2020 | Sinha ...................... G06Q 10/06 |

FOREIGN PATENT DOCUMENTS

CN 102037435 A 4/2011

* cited by examiner

*Primary Examiner* — Caroline H Jahnige
(74) *Attorney, Agent, or Firm* — KONRAD, RAYNES, DAVDA & VICTOR LLP; Rabindranath Dutta (57) ABSTRACT

Provided are a method, system, and computer program product in which a computational device generates information on an application switch by a user from a first application in a first device to a second application in a second device. Additional information continues to be generated on application switches on the second device. A visualization of the information and the additional information is provided to the user to allow the user to return to a point at which the application switch to the second application in the second device took place from the first application in the first device.

19 Claims, 10 Drawing Sheets

Operations and functions performed in certain embodiments

902 — 1.  Individual user or groups or businesses sign up for cognitive services.
904 — 2.  Enables the embodiments to leverage the user's personal data, devices, applications and preferences.
906 — 3.  Embodiments get triggered automatically upon: (a) User wearing AR glass and a switch to alternate device or application is detected; and (b) User in a non-AR environment switches to alternate device or application for task needs.
908 — 4.  The embodiments have access to the knowledge corpus of user, user profile, content, personal preferences and data security policies which were previously public, classified, confidential.
910 — 5.  The user data may also be available based on business forums, discussion groups, personal preferences on company intranet and any other smart or wearable devices of users or historical user patterns.
912 — 6.  The embodiments may derive information such as an individual user or group information through email client, web cameras in meeting rooms, video conferencing or messaging channel, etc.
914 — 7.  Smart meeting rooms, smart houses, smart micro locations, smart devices contribute to IoT based data sources for the embodiments.
916 — 8.  The embodiments derive context by using natural language processing techniques to understand the content and intent and language (or lack thereof, in case of images or symbols).
918 — 9.  The purpose of content in consideration are determined by the embodiments through machine learning techniques.
920 — 10.  The embodiments identify the switching of applications or devices.
922 — 11.  The embodiments further identifies the user actions on the switched applications or devices of the user (including AR glass).
924 — 12.  The embodiments leverage Deep Neural Network (DNN) techniques to start performing semantic analysis approach of matching content identified on source application or device to target application or device.
926 — 13.  The semantic text matching may involve matching the best candidate for the query content identified on source application or device.
928 — 14.  During scenarios of possibility of multiple result sets on target application/device matched by the embodiments, ranking algorithms are applied with specific weights to phrases, sentences, textual references or any user defined weightage factors.
930 — 15.  The top best candidate after ranking exercise may be identified by the embodiments to conditionally allow the user to continue current tasks or activities or notify the user about deviation from original intent caused by virtue of switching application or device.
932 — 16.  Embodiments employ time series algorithms to determine the current action, current purpose in correlation to original action and intended purpose before switching. This enables the system to facilitate time sensitive notifications that may be advanced or that may be acceptable within an elapsed time window.
934 — 17.  The embodiments further augment the notification on AR glass or any active Graphical user interface (GUI) of the user with an additional notification, pop-up, or flash about a detour in the content purpose of switching and facilitates a reversion back to content purpose or the original application or device.

MAINTENANCE OF FOCUS ON AN ORIGINAL TASK WHILE SWITCHING AMONG APPLICATIONS

BACKGROUND

1. Field

Embodiments relate to a method, system, and computer program product for the maintenance of focus on an original task while switching among applications.

2. Background

Modern computer operating systems may be designed around the concept of multi-tasking, enabling a computer to run more than one application at any time. Graphical user interfaces provide a mechanism to display the output of multiple applications, with the ability to layer multiple windows on top of each other, where each window may be running different applications at the same time.

Multiple applications may also be executed in parallel on devices like mobile phones, embedded devices, etc. In many situations a user may switch between the multiple applications that execute concurrently or in parallel on a computational device, such as a computer, a mobile phone, an embedded device, etc.

Augmented reality glasses and other forms of interaction and display devices are used in many computing environments including virtual reality environments, automotive and robot navigation environment, augmented reality (AR) environments, Internet of Things (IoT) environments, etc. Users may interact with multiple applications in many such computing environments.

SUMMARY OF THE PREFERRED EMBODIMENTS

Provided are a method, system, and computer program product in which a computational device generates information on an application switch by a user from a first application in a first device to a second application in a second device. Additional information continues to be generated on application switches on the second device. A visualization of the information and the additional information is provided to the user to allow the user to return to a point at which the application switch to the second application in the second device took place from the first application in the first device.

In additional embodiments, the information and the additional information are maintained as a map or a trace, where the second device is an Internet of Things (IoT) device.

In further embodiments, a hyperlink is provided in the information and the additional information, where upon clicking the hyperlink, the user is able to return to the first application.

In yet further embodiments, a purpose for moving away from an original activity that was ongoing in the first device is detected. A tracking is performed of subsequent user activity against the purpose that was detected.

In additional embodiments, help messages are displayed to the user to help the user to resume the original activity that was ongoing, where the computational device determines dynamically a device on which the help messages are displayed to the user.

In further embodiments, the original activity that was ongoing and a subsequent activity of the user are on different applications of an identical device.

In additional embodiments, the original activity that was ongoing and a subsequent activity of the user are on different devices.

In further embodiments, the computational device reminds the user of the point to return to, over an Augmented Reality (AR) glass, by using visual indicators including breadcrumbs and icons.

In yet further embodiments, the original activity that was ongoing is considered while generating the help messages that are displayed.

BRIEF DESCRIPTION OF THE DRAWINGS

Referring now to the drawings in which like reference numbers represent corresponding parts throughout:

FIG. 9 illustrates a block diagram that shows operations and functions performed for maintaining focus while switching applications, in accordance with certain embodiments.

DETAILED DESCRIPTION

In the following description, reference is made to the accompanying drawings which form a part hereof and which illustrate several embodiments. It is understood that other embodiments may be utilized and structural and operational changes may be made.

A user may need multiple applications, such as messaging applications, browsers, mail clients, etc., to accomplish a task. The different applications may be developed in silos. Since the applications are developed in silos, when a user switches from one application to another, there is no single path that the user can follow to return and resume actions on the initial application, where the actions had not been completed by the user.

For example, while using a messaging application, the user may realize that the user needs to refer to a mail that the other party in the conversation had sent a while back. Referring back to that mail may help drive the conversation correctly based on the content of that mail.

However, when the user switches application, from the messaging application to the mail application, the user may quickly get distracted by the high priority unread mails and may lose track of why the user came to the mailbox in the first place. At a later point when the user visits the messaging application because the other person the user was in conversation with has just pinged, the user may realize that after navigating out of that conversation to get details from the mail, the user had lost track. This happens not just between a messaging application and a mail application, but even between switches among other applications, such as from a browser to messaging clients, from mail clients to browsers, and so on.

The situation of losing track means that the user is at a certain point or place in an application window, and the user is wondering how the user reached that point or place. The user needs to know what the user was looking for before reaching that point or place in the application window. Needed are mechanisms to help a user to stay focused on the original activity that has not been completed, even when the user switches to a completely unrelated application.

Certain embodiments provide mechanisms that execute in computational systems including an Artificial Intelligence (AI), AR or IoT based systems to detect the purpose of moving away from an ongoing activity, track subsequent user activity against the detected purpose and provide mechanisms for the user to resume the original activity efficiently. As a result, improvements are made to the operations of computing devices in a computing environment by displaying interfaces in graphical user interfaces of the computing devices that allow a user to more navigate among a plurality of applications more effectively in comparison to existing mechanisms.

Exemplary Embodiments

Figure 1:
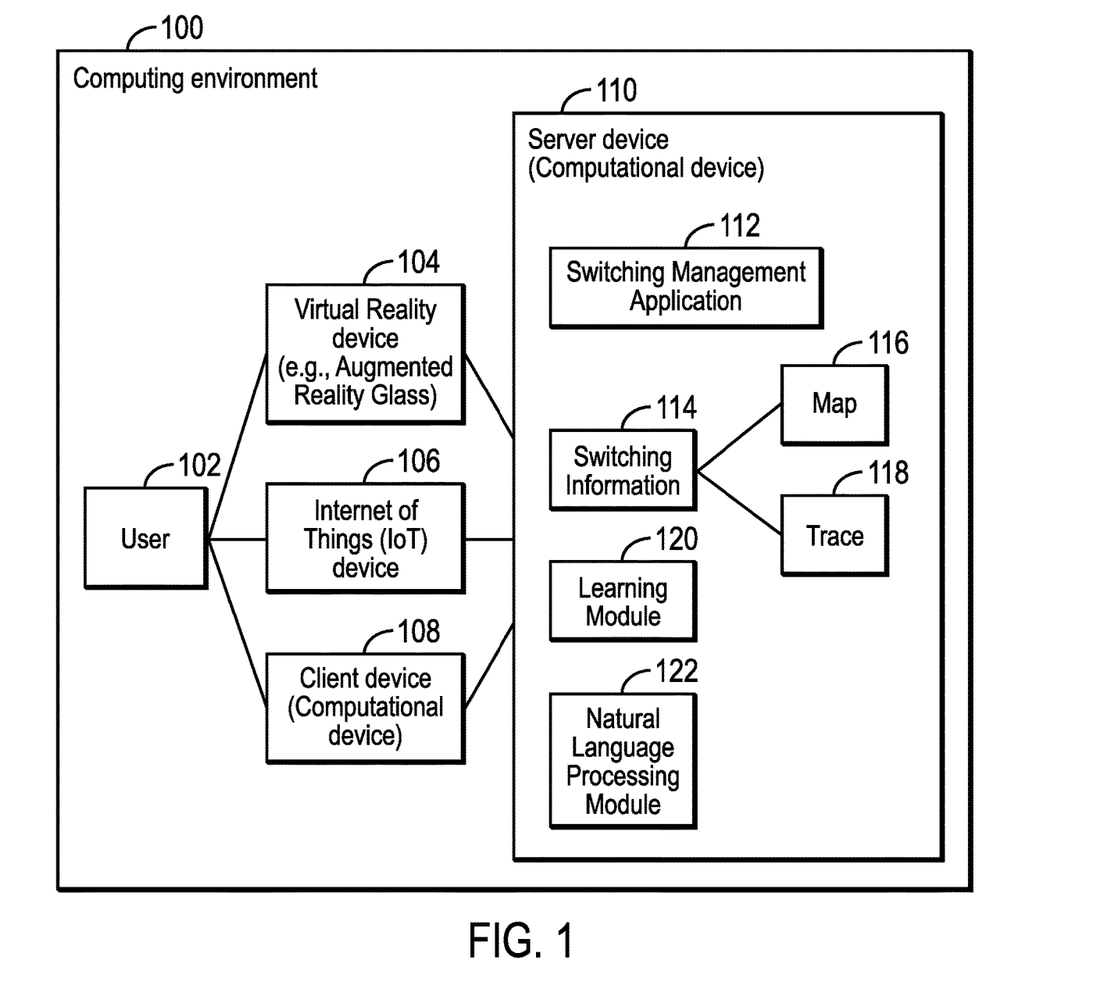
FIG. 1 illustrates a block diagram of a computing environment for the maintenance of focus on an original task while switching among applications, in accordance with certain embodiments.

FIG. 1 illustrates a block diagram of a computing environment 100 for the maintenance of focus on an original task while switching among applications, in accordance with certain embodiments.

A user 102 may interact with a plurality of devices, such as, a virtual reality device 104, an Internet of Things (IoT) device 106, a client device 108, etc. There may be additional devices that the user 102 may interact with and that are not shown in FIG. 1.

In certain embodiments, the virtual reality device 104 may comprise an augmented reality glass. The IoT device 106 may comprise devices such as sensors, smart home devices, smart wearables, etc. The client device 108 may comprise a computational device.

The virtual reality device 104, the IoT device 106 and the client device 108 may be communicatively coupled to a server device 110, where the server device 110 may comprise a computational device.

In certain embodiments, the virtual reality device 104, the IoT device 106, the client device 108, and the server device 110 may comprise any suitable computational device including those presently known in the art, such as, a personal computer, a workstation, a server, a mainframe, a hand held computer, a palm top computer, a head mounted computer, a telephony device, a network appliance, a blade computer, a processing device, a controller, a sensor device, a smart device, etc.

The virtual reality device 104, the IoT device 106, the client device 108, and the server device 110 may be elements in any suitable network, such as, a storage area network, a wide area network, the Internet, an intranet, etc. In certain embodiments, the virtual reality device 104, the IoT device 106, the client device 108, and the server device 110 may be elements in a cloud computing environment.

In certain embodiments, the user 102 may interact with a first application in one of the devices 104, 106, 108 and switch from the first application to a second application that executes in the same device or on another device. The user may subsequently switch to a third application.

A switching management application 112 that executes in the server device 110 keeps tracks of the switching of the user 102 among applications and devices in a data structure referred to as switching information 114. The switching information 114 records how the user moved among applications and stores the information in data structures, such as a map 116 or a trace 118 of the switching operations. The map 116 or trace 118 may include the points at which switching was performed among applications so that the user may be assisted to return to a pervious point. A learning module 120 and a natural language processing module 122 may be used by the switching management application 112 to augment the switching information 114.

The learning module 120 may comprise a neural network that uses artificial intelligence techniques to determine the intent of the user 102 as the user 102 switches among applications and devices. The natural language processing module 122 may analyze the text being read or typed by the user 102 in the various applications in order to determine the intent of the user 102 for switching among applications.

In certain embodiments, the switching management application 112, the learning module 120, and the natural language processing module 122 may be implemented in software, firmware, hardware or any combination thereof.

Therefore, FIG. 1 illustrates certain embodiments in which a switching management application 112 that executes in a server device 110 keeps tracks of the switching of applications and devices by the user 102 and assists the user 102 to return to a previous point to continue with an incomplete task as the user moves from one application to another.

Figure 2:
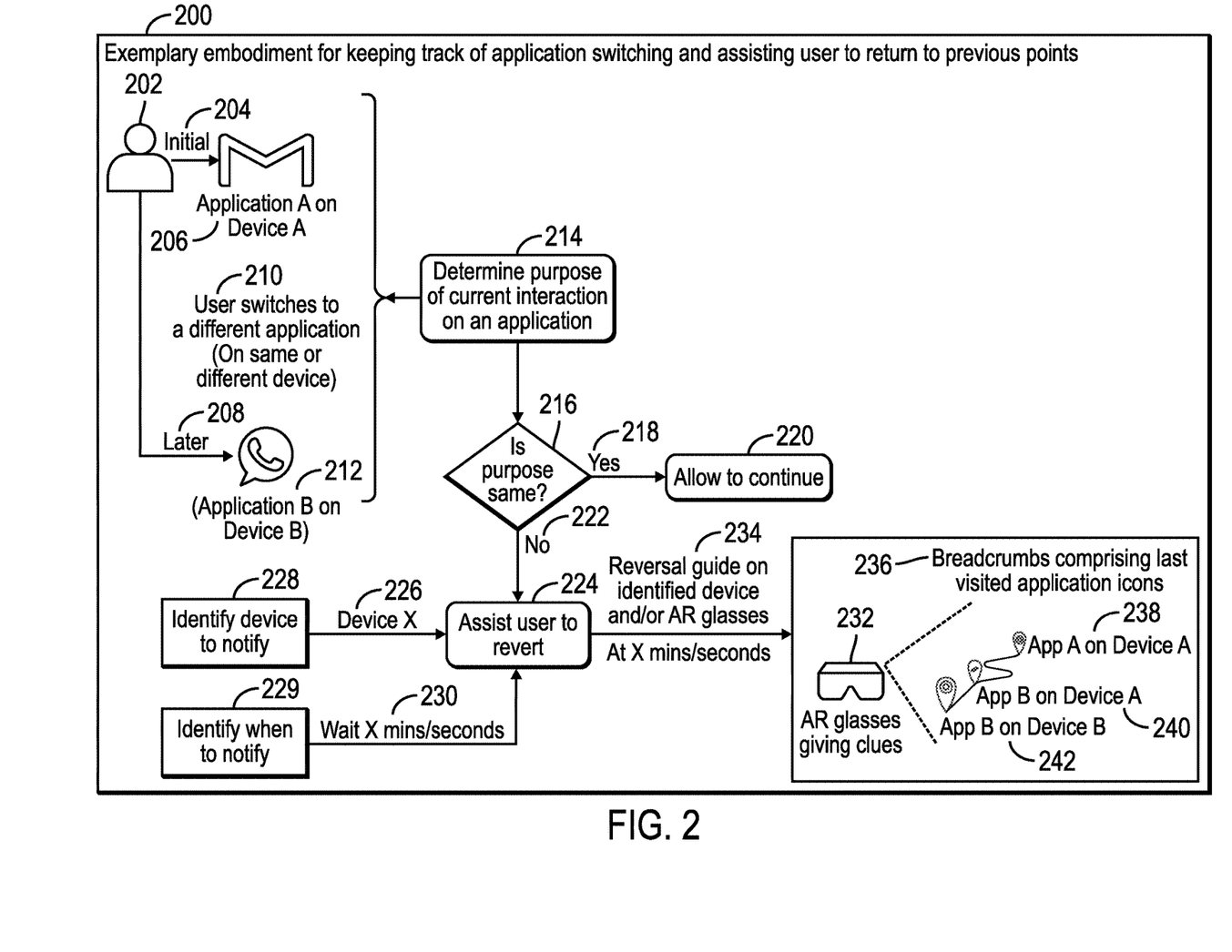
FIG. 2 illustrates a block diagram that shows an exemplary embodiment for keeping track of application switching and assisting a user to return to previous points, in accordance with certain embodiments.

FIG. 2 illustrates a block diagram 200 that shows an exemplary embodiment for keeping track of application switching and assisting a user to return to previous points, in accordance with certain embodiments.

In FIG. 2, a user 202 is initially interacting with Application A on device A (as shown via reference numeral 204, 206). At a later point in time the user 202 switches to a different application on the same or on a different device from device A (as shown via reference numerals 208, 210, 212. For example, in FIG. 2 the user 202 switches to interacting with Application B on device B (as shown via reference numeral 212).

In certain embodiments, the switching management application 112 may determine (at block 214) the purpose of current interaction with an application. Control proceeds to block 216 in which the switching management application 112 determines whether the purpose of the user after switching is the same after switching, as it was before switching. If so ("Yes" branch 218) the user is allowed to continue the interaction with the new application after switching (as shown via reference numeral 220).

If at block 216, the switching management application 112 determines that the purpose of the user after switching is not the same after switching as it was before switching ("No" branch 222) then the switching management application 112 performs operations to assist the user 202 to revert to the previous application (as shown via reference numeral 224).

The switching management application 112 may identify the device in which the user 102 is to be informed of the assistance (as shown via reference numerals 226, 228). The switching management application 112 may also determine when to notify the user (e.g., after waiting for a certain amount of time) as shown via reference numerals 229, 230.

In certain embodiments, the switching management application 112 may display on AR glasses 232 certain clues for the user 202 to revert to a previous point. The clues may also be provided as a reversal guide on another identified device besides the AR glasses at the time determined in block 229 (as shown via reference numeral 234).

In the AR glass 232, breadcrumbs comprising last visited application icons may be shown to the user 202 (as shown via reference numeral 236). The breadcrumbs may indicate the sequence in which the user 202 switched among applications and devices (as shown via reference numerals 238, 240, 242). For example, the breadcrumbs may display to the user 202 the movement from application A on device A, to application B on device A, and then to application B on device B (as shown via reference numerals 238, 240, 242) so that the user 202 is able to revert to a previous application with the information provided in the breadcrumbs.

Therefore, FIG. 2 describes certain embodiments in which a switching management application 112 may display the breadcrumbs accumulated over time on AR glasses 232 to a user 202 to assist the user 202 to revert to a previous application that may have been executed on a different device.

In certain embodiments, the switching management application 112 may create a map or trace of application switches within a device. The breadcrumbs are one methodology for implementing the map or trace in certain embodiments. When a user switches to applications on other devices, the map or trace may be continued by using IoT devices. The user is provided information to visualize this map or trace on an AR device. The map or trace may be comprised of navigable hyperlinks that the user may click and revert to the initial application. The visualization provided may also be a screenshot of the area of output of the application that was taken when the user chose to navigate out of the application.

When a user is on a certain application, the purpose is inferred and used as a guide to determine if an application switch was intended. If the new application does not appear to match the purpose, then the user is prompted to return. Upon prompting, the user may use a breadcrumb that allows the user to directly click and reach back to where the user left from. This walk back or reverting into the original track may be achieved via the breadcrumb. This solution approach is analogous to walking back an exception stack trace to reach the line of code that caused an exception.

While creating the trace or breadcrumbs, individual applications may be identified along with areas on that application, where the area is determined by where the mouse pointer or keyboard focus was, or the user's eye gaze focus when the user initiated a switch over to the other application.

For navigation to the initial application, the screenshot of the previous application window when a switch was being performed may be overlayed on the immediate next application, which when hovered can expand into the complete screenshot. The screenshot could also be a hyperlink, where clicking on the hyperlink will navigate to the application the screenshot belongs to. This way as the user continues to move from one window to another, a trail gets created, effectively creating a back button to the location where the user started from.

Further, when the switch is completed, highlighting keywords from the previous application on the new application interface can help ascertain that the user using a newer application was there because the user was indeed interested in one of those keywords from the previous application. Therefore, certain embodiments establish purpose-based navigation back and forth between applications. This prevents the user from getting distracted from critical notifications or messages on the current application window.

Figure 3:
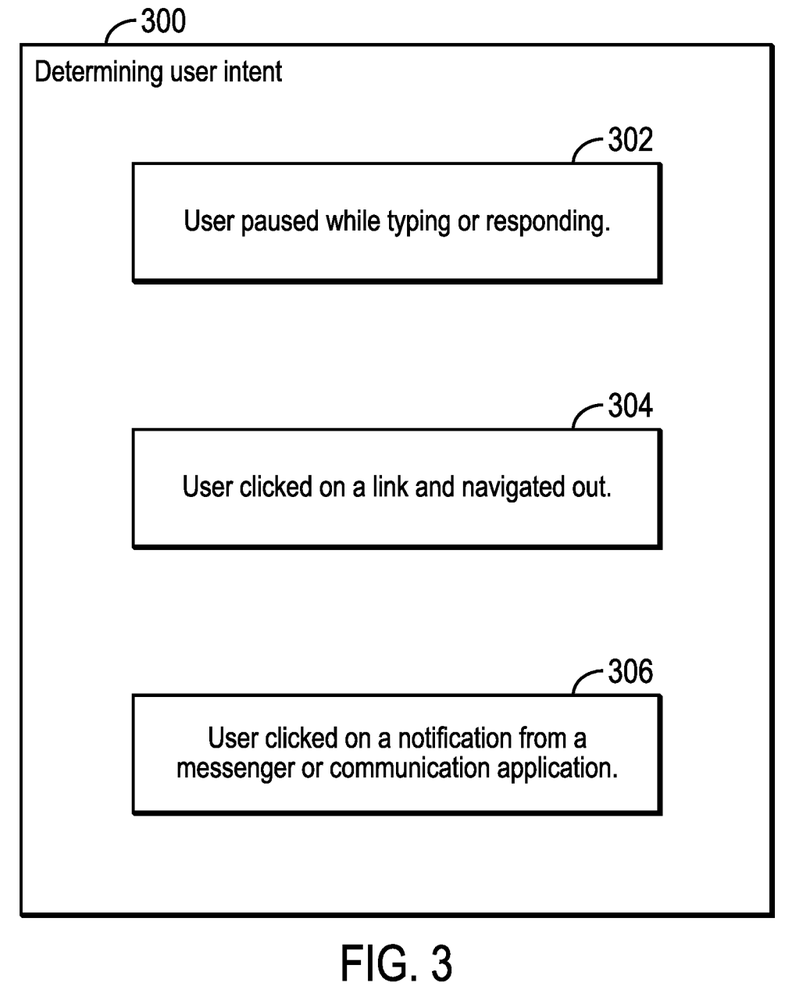
FIG. 3 illustrates a block diagram that shows situations in which user intent is determined, in accordance with certain embodiments.

FIG. 3 illustrates a block diagram 300 that shows situations in which user intent is determined by the switching management application 112, in accordance with certain embodiments.

The user intent may comprise a derived understanding of what the user intended to do and is determined based on the user actions during the switching.

For example, if the user had paused while typing or responding (reference numeral 302), it indicates that the user was probably gathering or recollecting what is relevant to the conversation at hand and a switch here means that the user is not done using the current application as yet, and would want to still return here to continue conversation.

If the user had clicked on a link in the conversation and navigated out (reference numeral 304), it indicates the user wants to review what is in the link and come back to this conversation, and the user is not yet done with this conversation.

If the user had clicked on a notification from a messenger or communication application (reference numeral 306), it implies that the user deliberately prioritized navigating out compared to responding or staying on the current conversation. The user does not have to be reminded to revert in such a situation.

Figure 4:
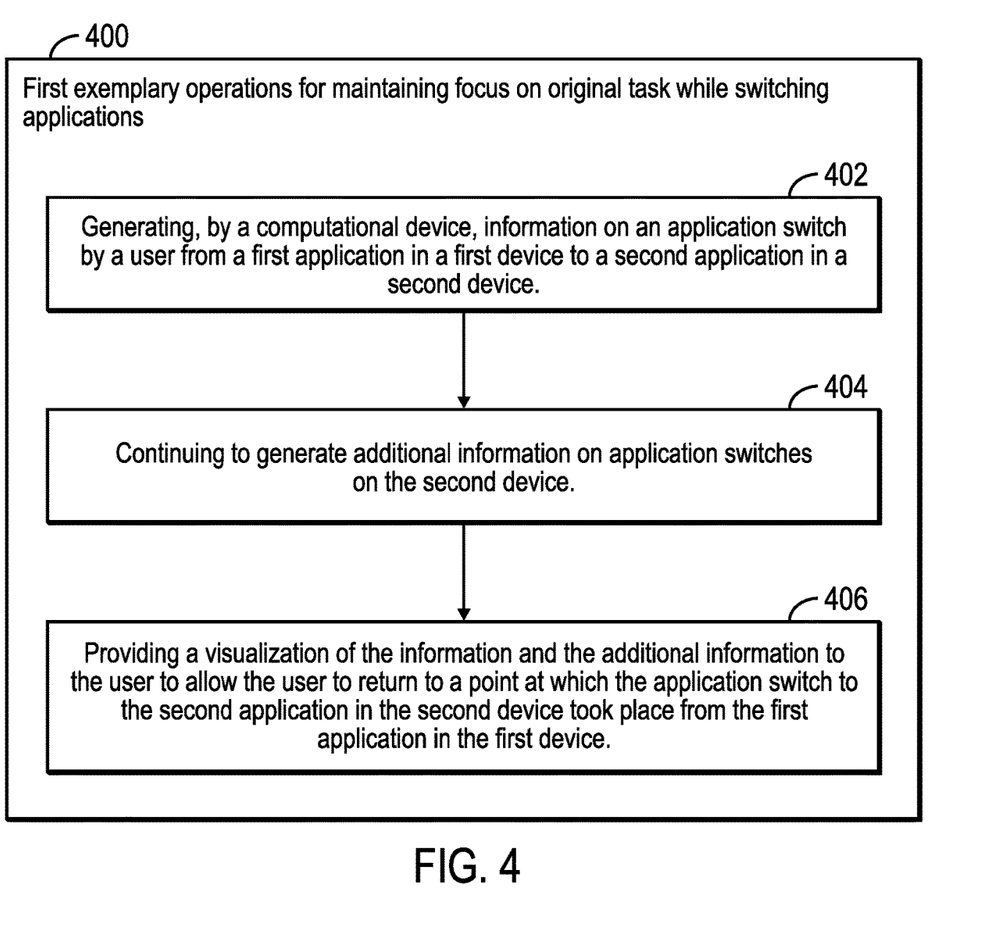
FIG. 4 illustrates a flowchart that shows first exemplary operations for the maintenance of focus on an original task while switching among applications, in accordance with certain embodiments.

FIG. 4 illustrates a flowchart 400 that shows first exemplary operations for the maintenance of focus on an original task while switching among applications, in accordance with certain embodiments.

Control starts at block 402 in which a computational device 110 generates information on an application switch by a user 102 from a first application in a first device to a second application in a second device. Additional information continues to be generated (at block 402) on application switches on the second device. The application switches on the second device may be from one application to another within the second device, or from an application executing in the second device to another application in a device that is different from the second device.

From block 402 control proceeds to block 404 in which a visualization of the information and the additional information is provided to the user 102 to allow the user 102 to return to a point at which the application switch to the second application in the second device took place from the first application in the first device.

Figure 5:
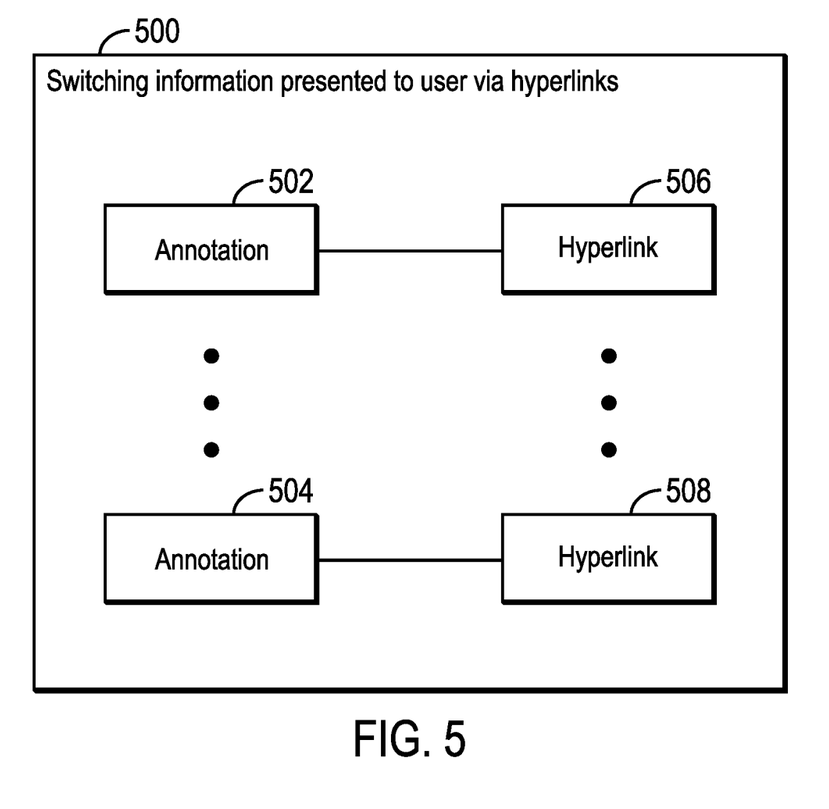
FIG. 5 illustrates a block diagram that shows how switching information is presented to user via hyperlinks, in accordance with certain embodiments.

FIG. 5 illustrates a block diagram 500 that shows how switching information is presented to user via hyperlinks, in accordance with certain embodiments.

A plurality of annotations 502, 504 and corresponding hyperlinks 506, 508 may be displayed to a user 102 for assisting the user 102 to navigate to a previous application.

In certain embodiments the hyperlinks 508, 508 may be included in breadcrumbs and displayed in AR glasses to the user 102 as shown previously in FIG. 2. The annotations 502, 504 are help messages for the user, where the help messages allow the user to determine which hyperlinks to click.

Figure 6:
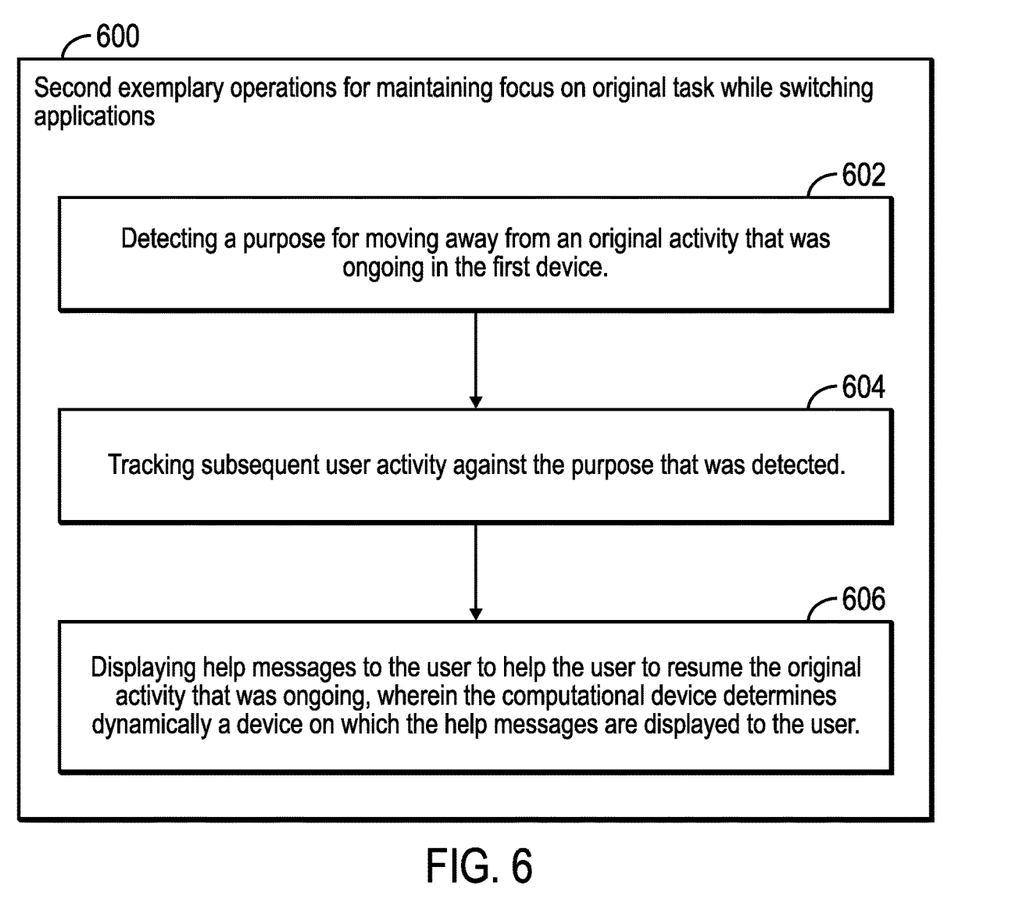
FIG. 6 illustrates a flowchart that shows second exemplary operations for the maintenance of focus on an original task while switching among applications, in accordance with certain embodiments.

FIG. 6 illustrates a flowchart 600 of second exemplary operations for the maintenance of focus on an original task while switching among applications, in accordance with certain embodiments. The operations shown in FIG. 6 may be performed by the switching management application 112 that executes in the server device 110.

Control starts at block 602 in which a purpose for moving away from an original activity that was ongoing in the first device is detected. A tracking is performed (at block 604) of subsequent user activity against the purpose that was detected.

From block 604 control proceeds to block 606 in which help messages are displayed to the user 102 to assist the user 102 to resume the original activity that was ongoing, where the computational device (e.g., the server device 110) determines dynamically a device on which the help messages are displayed to the user 102. In certain embodiments the help messages are displayed to the user 102 on AR glasses.

Figure 7:
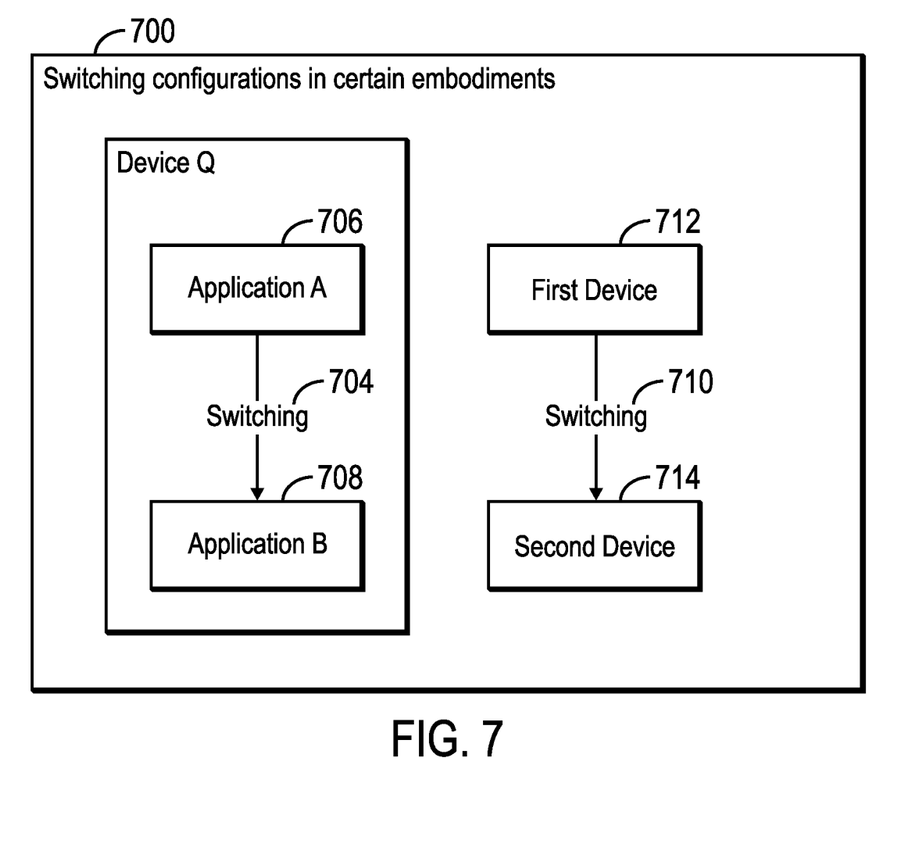
FIG. 7 illustrates a block diagram that shows switching configurations in certain embodiments, in accordance with certain embodiments.

FIG. 7 illustrates a block diagram 700 that shows switching configurations in certain embodiments, in accordance with certain embodiments.

In certain embodiments, the original activity that was ongoing and a subsequent activity of the user are on different applications of an identical device. For example, FIG. 7 shows a device Q 702 in which the user 102 switches from application A 706 to Application B 708.

In additional embodiments, the original activity that was ongoing and a subsequent activity of the user are on different devices. For example, FIG. 7 shows the user 102 performing a switch 710 from an application that executes on a first device 712 to another application that executes on a second device 714.

Figure 8:
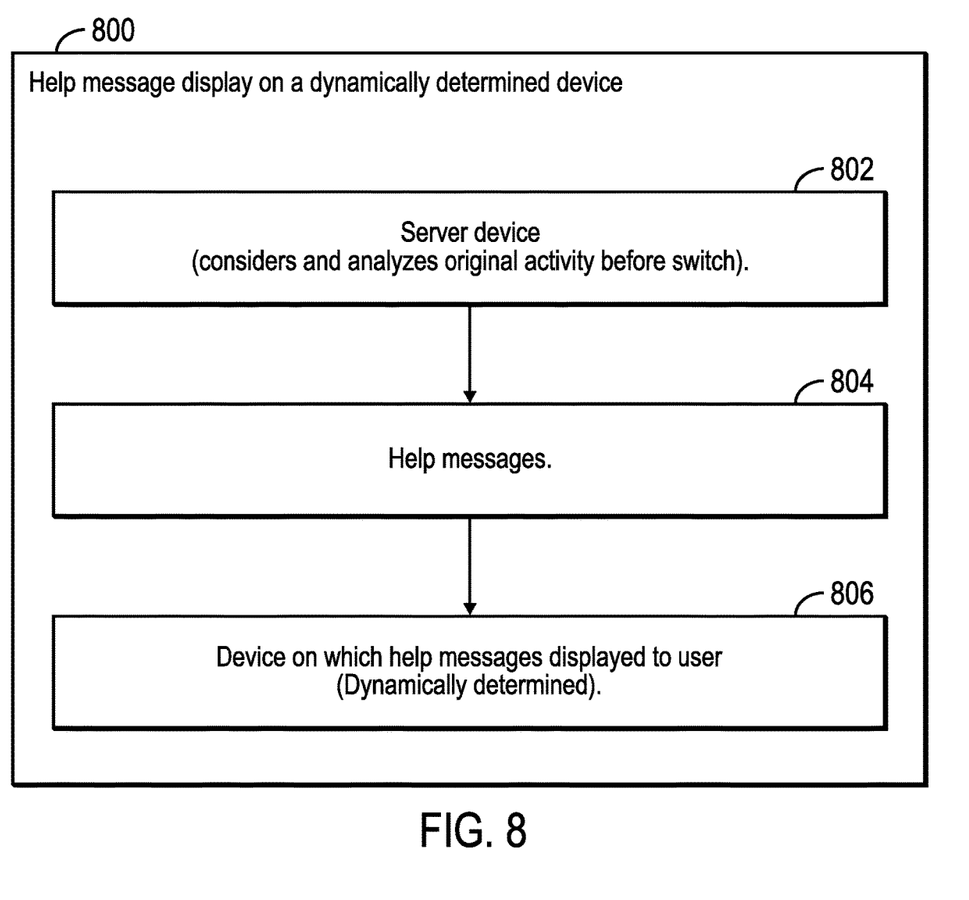
FIG. 8 illustrates a block diagram that shows display of help messages on a dynamically determined device, in accordance with certain embodiments.

FIG. 8 illustrates a block diagram 800 that shows display of help messages on a dynamically determined device, in accordance with certain embodiments. A server device considers and analyzes the original activity of a user before an application switch by the user (as shown via reference numeral 802). The server device transmits appropriately tailored help messages 804 to the device on which help messages are to be displayed to the user (as shown via reference numeral 806). The device on which help messages are to be displayed may be dynamically determined by the server device based on what device the user may have previously indicated, or alternatively based on the device that the server device finds suitable for the user.

FIG. 9 illustrates a block diagram 900 that shows operations and functions performed for maintaining focus while switching applications, in accordance with certain embodiments.

In certain embodiments, individual user or groups or businesses may sign up for cognitive services (reference numeral 902). This is required to enable the embodiments to leverage a user's personal data, devices, applications and preferences (reference numeral 904).

Operations for reverting may get triggered automatically upon: (a) User wearing AR glass and a switch to alternate device or application is detected; and (b) User in a non-AR environment switches to alternate device or application for the user's task needs (reference numeral 906).

The embodiments may have access to the knowledge corpus of user, user profile, content, personal preferences and data security policies which were previously public, classified, or confidential (reference numeral 908). The user data may also be available based on business forums, discussion groups, personal preferences on company intranet and any other smart or wearable devices of users or via historical user patterns (reference numeral 910).

The embodiments may derive information such as an individual user or group information through email client, web cameras in meeting rooms, video conferencing, messaging channel, etc. (reference numeral 912). Smart meeting rooms, smart houses, smart micro locations, smart devices may contribute to IoT based data sources for the embodiments (reference numeral 914).

The embodiments derive context by leveraging Natural Language Processing (NLP) techniques to understand the content and intent and language (or lack thereof, in case of images or symbols) [reference numeral 916]. The purpose of content in consideration being viewed, edited, or any other actions being performed are determined in the embodiments through machine learning techniques (reference numeral 918), where the content in consideration may be viewed, edited or be subjected to other actions.

The embodiments identify the switching of applications or devices (reference numeral 920). The embodiments further identify the user actions on the switched applications or devices of the user (including AR glass) [reference numeral 922]

The embodiments leverage Deep Neural Network (DNN) techniques to start performing semantic analysis approach of matching content identified on source application or device to target application or device (reference numeral 924). The semantic text matching may involve matching the best candidate for the query content identified on source application or device (reference numeral 926).

During scenarios of possibility of multiple result sets on target application or device matched by the embodiments, ranking algorithms are applied with specific weights to phrases, sentences, textual references or any user defined weightage factors (reference numeral 928). The best candidate after the ranking exercise may be identified by the embodiments to conditionally allow the user to continue current tasks or activities or notify the user about deviation from original intent caused by virtue of switching application or device (reference numeral 930).

The embodiments employ time series algorithms to determine the current action, and the current purpose in correlation to original action and intended purpose before switching. This enables the system to facilitate time sensitive notifications that may be advanced or that may be acceptable within an elapsed time window (reference numeral 932).

The embodiments further augment the notification on AR glass or any active graphical user interface (GUI) of the user with an additional notification, pop-up, or flash about a detour in the content purpose of switching, and facilitates a reversion to content purpose or the original application or device (reference numeral 934)

Therefore FIGS. 1-9 illustrate certain embodiments that allow a user to return to a previous application while navigating among applications that execute in a plurality of devices.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 10:
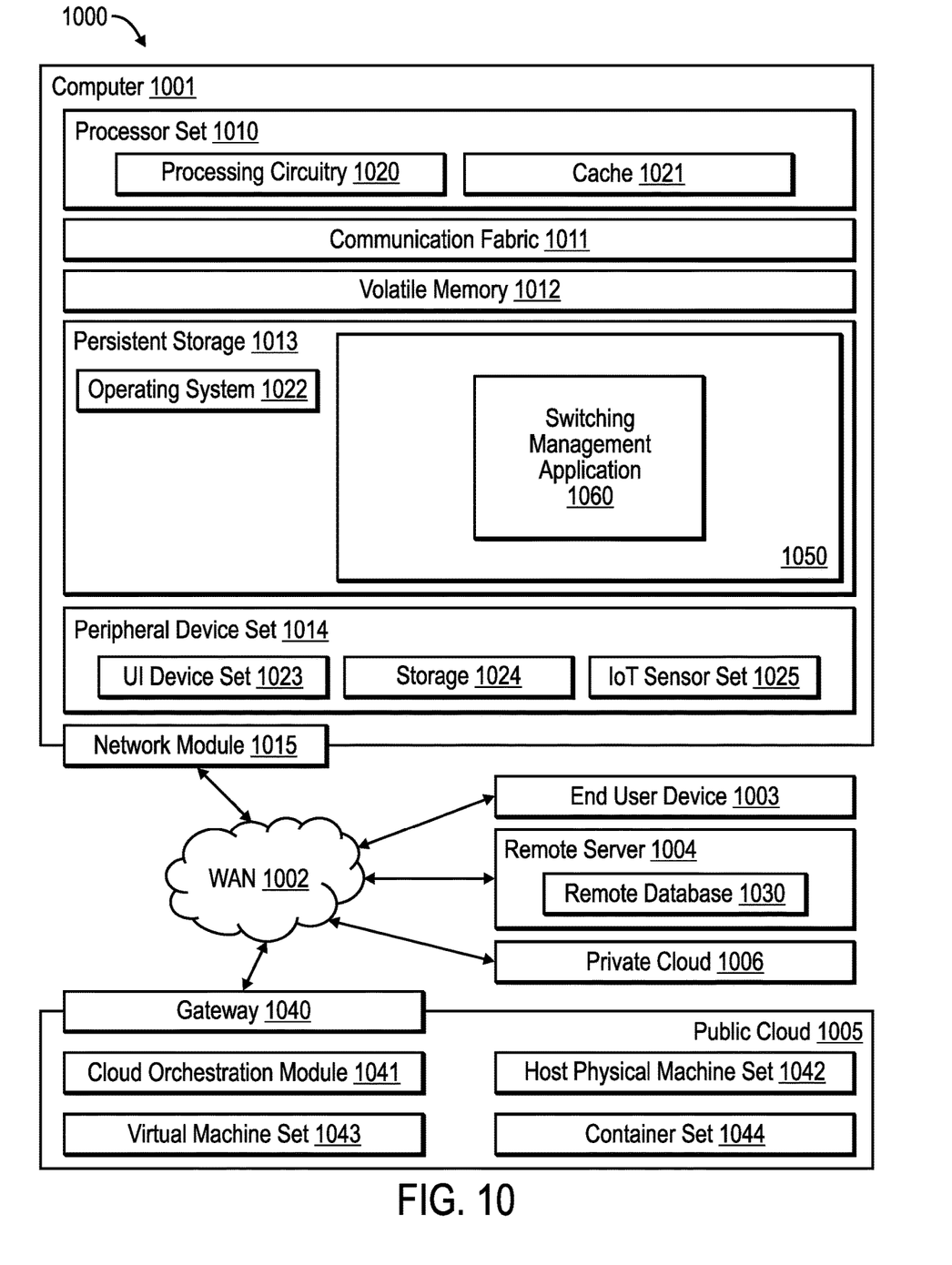
FIG. 10 illustrates a computing environment in which certain components of FIG. 1 may be implemented, in accordance with certain embodiments.

In FIG. 10, computing environment 1000 contains an example of an environment for the execution of at least some of the computer code (block 1050) involved in performing the operations of the switching management application 1060.

In addition to block 1050, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1050, as identified above), peripheral device set 1014 (including user interface (UI) device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 1050 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, volatile memory 1012 is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface-type operating systems that employ a kernel. The code included in block 1050 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN 1002 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method comprising:
generating, by a computational device, information on an application switch by a user from a first application in a first device to a second application in a second device;
continuing to generate additional information on application switches on the second device;
providing a visualization of the information and the additional information to the user to allow the user to return to a point at which the application switch to the second application in the second device took place from the first application in the first device;
detecting a purpose for moving away from an original activity that was ongoing in the first device; and
tracking subsequent user activity against the purpose that was detected, wherein in response to determining that a purpose of interaction with the second application on the second device is identical to a purpose of interaction with the first application on the first device, allowing the second application to continue, and otherwise assisting the user to return to the first application, wherein the computational device provides a reminder of a point to return to, over an Augmented Reality (AR) glass that shows breadcrumbs that indicate a sequence in which application switches have been made, wherein a reversion to a previously executed application is made by using information provided in the breadcrumbs, and wherein a ranking mechanism that provides weights to natural language elements is used to determine whether to continue current tasks or to indicate a deviation from original intent caused by the application switches.

2. The method of claim 1, wherein the information and the additional information are maintained as a map or a trace, and wherein the second device is an Internet of Things (IoT) device.

3. The method of claim 2, wherein a hyperlink is provided in the information and the additional information, and wherein upon clicking the hyperlink the user is able to return to the first application.

4. The method of claim 1, the method further comprising: displaying help messages to the user to assist the user to resume the original activity that was ongoing, wherein the computational device determines dynamically a device on which the help messages are displayed to the user.

5. The method of claim 1, wherein the original activity that was ongoing and a subsequent activity of the user are on different applications of an identical device.

6. The method of claim 1, wherein the original activity that was ongoing and a subsequent activity of the user are on different devices.

7. The method of claim 1, wherein the original activity that was ongoing is considered while generating help messages that are displayed.

8. A system, comprising:
a memory; and
a processor coupled to the memory, wherein the processor performs operations, the operations comprising:
generating, by a computational device, information on an application switch by a user from a first application in a first device to a second application in a second device;
continuing to generate additional information on application switches on the second device;
providing a visualization of the information and the additional information to the user to allow the user to return to a point at which the application switch to the second application in the second device took place from the first application in the first device;
detecting a purpose for moving away from an original activity that was ongoing in the first device; and
tracking subsequent user activity against the purpose that was detected, wherein in response to determining that a purpose of interaction with the second application on the second device is identical to a purpose of interaction with the first application on the first device, allowing the second application to continue, and otherwise assisting the user to return to the first application, wherein the computational device provides a reminder of a point to return to, over an Augmented Reality (AR) glass that shows breadcrumbs that indicate a sequence in which application switches have been made, wherein a reversion to a previously executed application is made by using information provided in the breadcrumbs, and wherein a ranking mechanism that provides weights to natural language elements is used to determine whether to continue current tasks or to indicate a deviation from original intent caused by the application switches.

9. The system of claim 8, wherein the information and the additional information are maintained as a map or a trace, and wherein the second device is an Internet of Things (IoT) device.

10. The system of claim 9, wherein a hyperlink is provided in the information and the additional information, and wherein upon clicking the hyperlink the user is able to return to the first application.

11. The system of claim 8, the operations further comprising: displaying help messages to the user to assist the user to resume the original activity that was ongoing, wherein the computational device determines dynamically a device on which the help messages are displayed to the user.

12. The system of claim 8, wherein the original activity that was ongoing and a subsequent activity of the user are on different applications of an identical device.

13. A computer program product, the computer program product comprising a computer readable storage medium having computer readable program code embodied therewith, wherein the computer readable program code when executed is configured to perform operations, the operations comprising:
generating, by a computational device, information on an application switch by a user from a first application in a first device to a second application in a second device;
continuing to generate additional information on application switches on the second device;
providing a visualization of the information and the additional information to the user to allow the user to return to a point at which the application switch to the second application in the second device took place from the first application in the first device;
detecting a purpose for moving away from an original activity that was ongoing in the first device; and
tracking subsequent user activity against the purpose that was detected, wherein in response to determining that a purpose of interaction with the second application on the second device is identical to a purpose of interaction with the first application on the first device, allowing the second application to continue, and otherwise assisting the user to return to the first application, wherein the computational device provides a reminder of a point to return to, over an Augmented Reality (AR) glass that shows breadcrumbs that indicate a sequence in which application switches have been made, wherein a reversion to a previously executed application is made by using information provided in the breadcrumbs, and wherein a ranking mechanism that provides weights to natural language elements is used to determine whether to continue current tasks or to indicate a deviation from original intent caused by the application switches.

14. The computer program product of claim 13, wherein the information and the additional information are maintained as a map or a trace, and wherein the second device is an Internet of Things (IoT) device.

15. The computer program product of claim 14, wherein a hyperlink is provided in the information and the additional information, and wherein upon clicking the hyperlink the user is able to return to the first application.

16. The computer program product of claim 13, the operations further comprising:
displaying help messages to the user to assist the user to resume the original activity that was ongoing, wherein the computational device determines dynamically a device on which the help messages are displayed to the user.

17. The computer program product of claim 13, wherein the original activity that was ongoing and a subsequent activity of the user are on different applications of an identical device.

18. The computer program product of claim 13, wherein the original activity that was ongoing and a subsequent activity of the user are on different devices.

19. The system of claim 8, wherein the original activity that was ongoing and a subsequent activity of the user are on different devices.

* * * * *